(12) United States Patent
Gandhi et al.

(10) Patent No.: US 6,560,657 B1
(45) Date of Patent: May 6, 2003

(54) SYSTEM AND METHOD FOR CONTROLLING PERIPHERAL DEVICES

(75) Inventors: Wishwesh Gandhi, Folsom, CA (US); Aditya Sreenivas, El Dorado Hill, CA (US); Peter Doyle, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,705

(22) Filed: Dec. 23, 1999

(51) Int. Cl.[7] ............... G06F 13/10; G06F 13/14
(52) U.S. Cl. ............... 710/5; 710/52; 710/53; 711/100; 711/154; 711/155
(58) Field of Search ............... 710/5, 52, 53; 711/100, 154, 155

(56) References Cited

U.S. PATENT DOCUMENTS

| | | | | |
|---|---|---|---|---|
| 5,418,913 A | * | 5/1995 | Fujimoto | 707/104.1 |
| 5,845,154 A | * | 12/1998 | Krakirian | 710/105 |
| 5,974,483 A | * | 10/1999 | Ray et al. | 326/56 |
| 6,240,508 B1 | * | 5/2001 | Brown et al. | 710/39 |
| 6,317,759 B1 | * | 11/2001 | Osmond | 707/513 |
| 6,389,508 B1 | * | 5/2002 | Tamura | 711/112 |

* cited by examiner

Primary Examiner—Jeffrey Gaffin
Assistant Examiner—Rehana Perveen
(74) Attorney, Agent, or Firm—Blakely, Sokoloff, Taylor & Zafman LLP

(57) ABSTRACT

A system and method for controlling peripheral devices wherein at least one command is written to a location in a system memory and a write pointer is advanced. A peripheral device then reads the at least one command from that location in memory, increments a read pointer and executes the at least one command.

12 Claims, 6 Drawing Sheets

SYSTEM AND METHOD FOR CONTROLLING PERIPHERAL DEVICES

FIELD OF THE INVENTION

The present invention is related to a system and method for transmitting commands to peripheral devices.

ART BACKGROUND

A common function of electronic systems is the controlling, by a CPU, of peripheral devices, such as graphics, disk drive and network controllers. Such devices often include storage locations of 1 or more bits that must be set to a 1 or 0 as part of the process of being controlled by a CPU. Many peripheral devices provide storage locations (hereinafter referred to as registers) meant to be directly accessible by a CPU at one or more addresses on the bus to which these peripheral devices are coupled. To control such devices, a CPU performs a write operation to set the one or more bits of a register within the peripheral device to some desired value. Other peripheral devices provide a queue of storage locations (hereinafter referred to as a command buffer) into which a CPU writes multiple values, at least some of which represent commands to be executed by the peripheral or values to be written to registers within the peripheral. Such buffers are typically implemented as a set or storage cells within the peripheral device, itself, or a storage device coupled to the peripheral device.

In many electronic systems, having a CPU directly control a peripheral device by writing to registers or a command buffer can degrade overall system performance. This is often attributable to delays either within the peripheral device, itself, or caused by the manner in which the peripheral device is coupled to a CPU. A CPU and the means by which a CPU is connected to the peripheral device may be faster at transmitting a value being written to a register or command buffer of a peripheral device than the register or command buffer is at storing the value. The means through which a CPU must transmit a value to the peripheral device may constrain the speed at which values may be transmitted, either due to design limitations or because the same means is also being used in the unrelated transfer of other values. Furthermore, it may be the case that a series of values needs to be transmitted to the peripheral device, but the writing of one or more of the values must be delayed until the peripheral device has finished acting on a previously transmitted value.

Many current day electronic systems have multiple busses by which values are transferred between devices within the system, and often, the fastest of these busses is the one that exists between a CPU and system memory in order to ensure optimal performance. Therefore, in such systems, a CPU is able to transmit a value to system memory far faster than it is able to transmit the same value to a peripheral device.

SUMMARY OF THE INVENTION

A system and method for controlling peripheral devices wherein at least one command is written to a location in a system memory and a write pointer is advanced. A peripheral device reads the at least one command from that location in memory, increments a read pointer and executes the at least one command.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The present invention is described in the context of the interaction within a computer system of a CPU with system memory and a graphics controller. However, the present invention is applicable to a variety of types of electronic systems other than a general purpose computer system. The present invention is also applicable to a variety of types of peripheral devices other than a graphics controller, including an audio digital signal processor (DSP), a disk controller (e.g., a SCSI bus controller) and a network interface controller.

Figure 1:
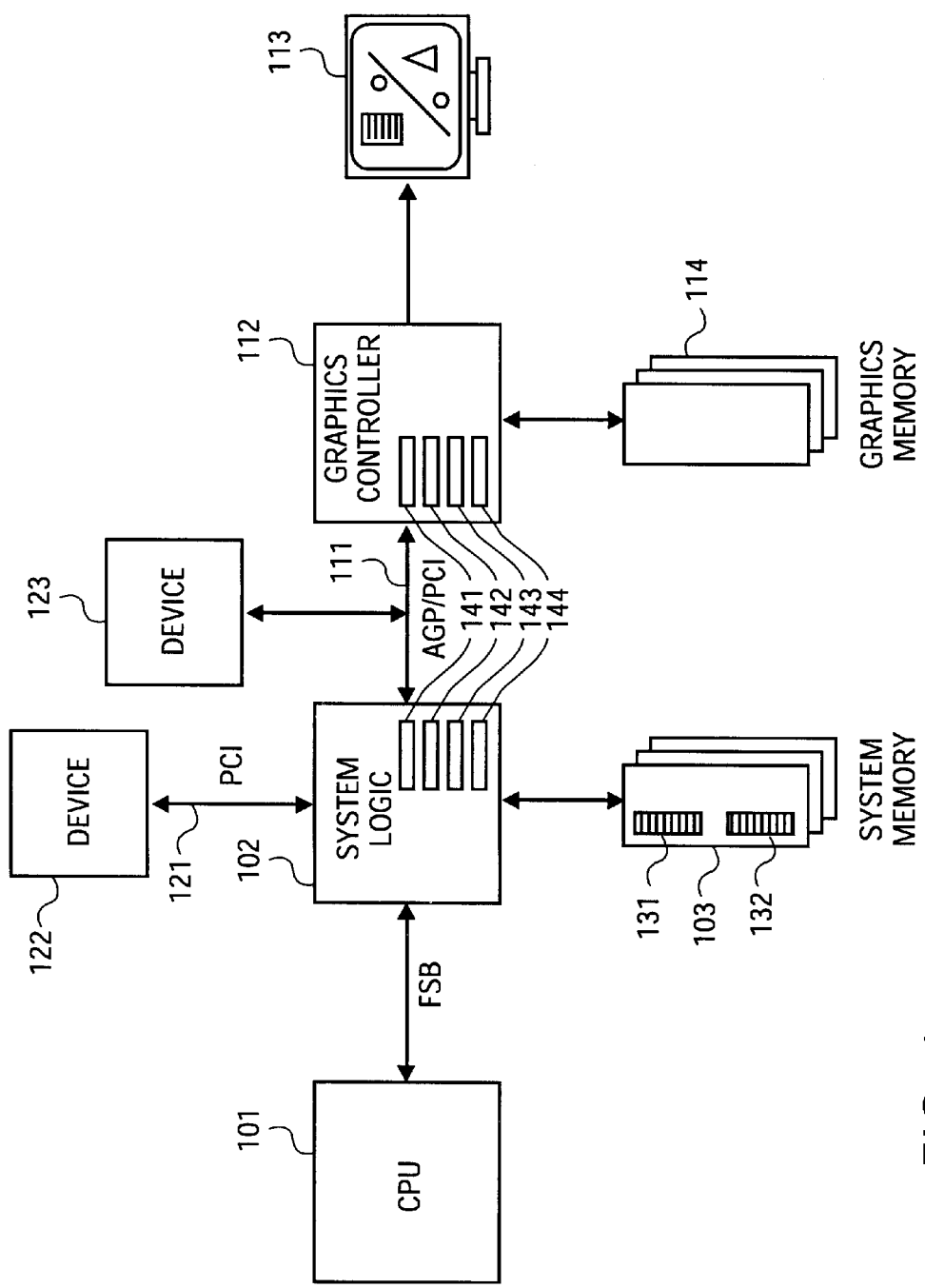
FIG. 1 is a simplified block diagram of a computer system in accordance with one embodiment of the present invention.

An embodiment of a computer system incorporating the teachings of the present invention is depicted in FIG. 1, and principally includes CPU 101, coupled to system logic 102, which is, in turn, coupled to system memory 103. System logic 102 is also coupled to graphics controller 112 by way of bus 111. Graphics controller 112 drives display 113 with an image, and is coupled to a graphics memory 114, in which the image is stored. In many computer systems, system logic 102 is also typically coupled to device 122 by way of another bus 121, or to device 123 by way of the same bus 111 that couples system logic 102 to graphics controller 112. Devices 122 and 123 are additional devices such as peripheral, storage, processing or bus interfacing devices as those skilled in the art will understand.

At specified locations within system memory 103 are buffers 131 and 132. Carried within either the graphics controller 112 or logic external to graphics controller 112, such as within system logic 102, are write pointers 141 and 143, and read pointers 142 and 144. As will be understood by those skilled in the art, buffer 131, write pointer 141 and read pointer 142 can be used together to provide a ring buffer with first-in-first-out (FIFO) characteristics. Data may be stored by writing to a location within buffer 131 pointed to by write pointer 141, and then advancing write pointer 141 by incrementing it to point to the next location within buffer 131. Alternatively, if write pointer 141 is already pointing to the last location within buffer 131, write pointer 141 may be set to point to the first location within buffer 131, giving the use of locations within buffer 131 a circular or "ring" characteristic. Buffer 132, read pointer 143 and write pointer 144 can be used together to provide a second ring buffer with identical functionality. Buffer 131 is the primary buffer used in controlling graphics controller 112, but this control can be interrupted, and the flow of execution of commands by graphics controller 112 can be altered, by writing commands into buffer 132 which has a higher priority than buffer 131.

CPU 101 controls graphics controller 112 by writing commands into buffer 131 and advancing write pointer 141. In response to the advancing of write pointer 141, graphics controller 112 reads and executes the commands written to buffer 131 starting at the location pointed to by read pointer 142, while advancing read pointer 142 until a comparison of the relative values of write pointer 141 and read pointer 142 indicate that there are no more commands to be read or executed in buffer 131.

CPU 101 can interrupt the execution of commands written into buffer 131 by writing other commands into buffer 132, and advancing write pointer 143. In response to the advancing of write pointer 143, graphics controller 112 halts the reading and execution of commands written to buffer 131, reads and executes the commands written to buffer 132, advances read pointer 144 in a similar manner, and resumes the reading and execution of commands from buffer 131 when there are no more commands to be read or executed in buffer 132.

CPU 101 can ensure that the execution of a particular sequence of commands written to buffer 131 are not interrupted by the writing of commands to buffer 132 by including a command for graphics controller 112 to ignore commands written to buffer 132 in the group of commands written to buffer 131. In one embodiment, this would entail causing graphics controller 112 to simply not respond to the advancing of write pointer 143. In another embodiment, this would entail causing graphics controller 112 to read the commands written to buffer 132, but not execute them. Graphics controller 112 may continue to ignore commands written to buffer 132 until either the particular sequence of commands written to buffer 131 has been read and executed or a command for graphics controller 112 to no longer ignore commands written to buffer 132 has been read by graphics controller 112.

In one embodiment, graphics controller 112 can ensure the continuing execution of commands, when a command to wait for a specified event is encountered among the commands written to buffer 132, by switching to reading and executing commands written to buffer 131 until the specified event occurs.

Figure 2:
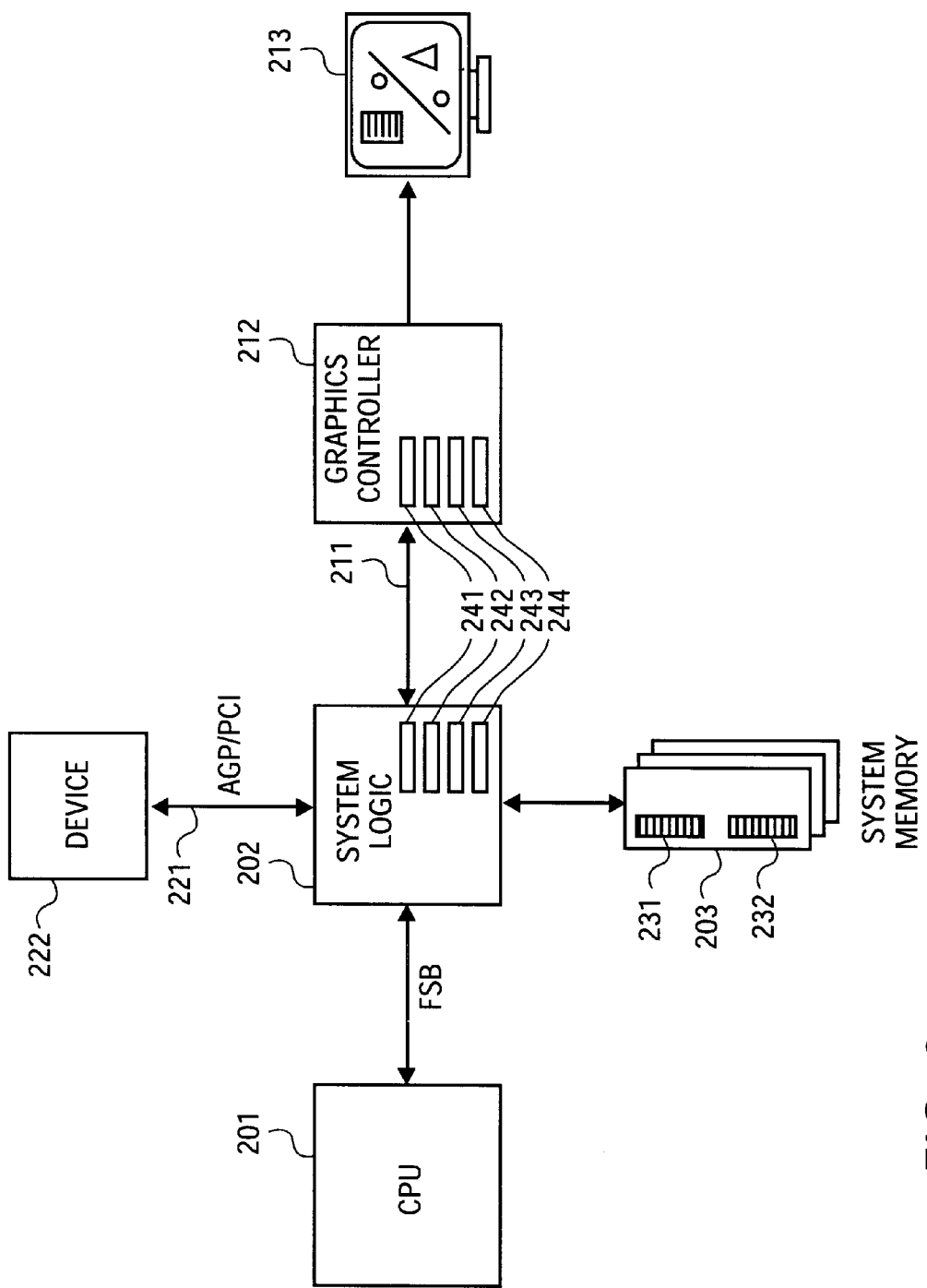
FIG. 2 is a simplified block diagram of a computer system in accordance with another embodiment of the present invention.

Another embodiment of a computer system incorporating the teachings of the present invention is depicted in FIG. 2, and principally includes CPU 201, coupled to system logic 202, which is, in turn, coupled to system memory 203. System logic 202 is also coupled to graphics controller 212 by way of bus 211. Graphics controller 212 drives display 213 with an image. In many computer systems, system logic 202 is also typically coupled to device 222 by way of another bus 221. Device 222 is a device such as a peripheral, storage, processing or bus interfacing device as those skilled in the art will understand. The principal difference between the computer systems of FIGS. 1 and 2 is that graphics controller 112 is coupled to graphics memory 114 which provides storage for the image being displayed on display 113, while graphics controller 212 makes use of system memory 203 for this purpose.

CPU 201 controls graphics controller 212 by using buffers 231 and 232, write pointers 241 and 243, and read pointers 242 and 244 in a manner similar to that in which the computer system of FIG. 1 used buffers 131 and 132, write pointers 141 and 143, and read pointers 142 and 144.

Figure 3:
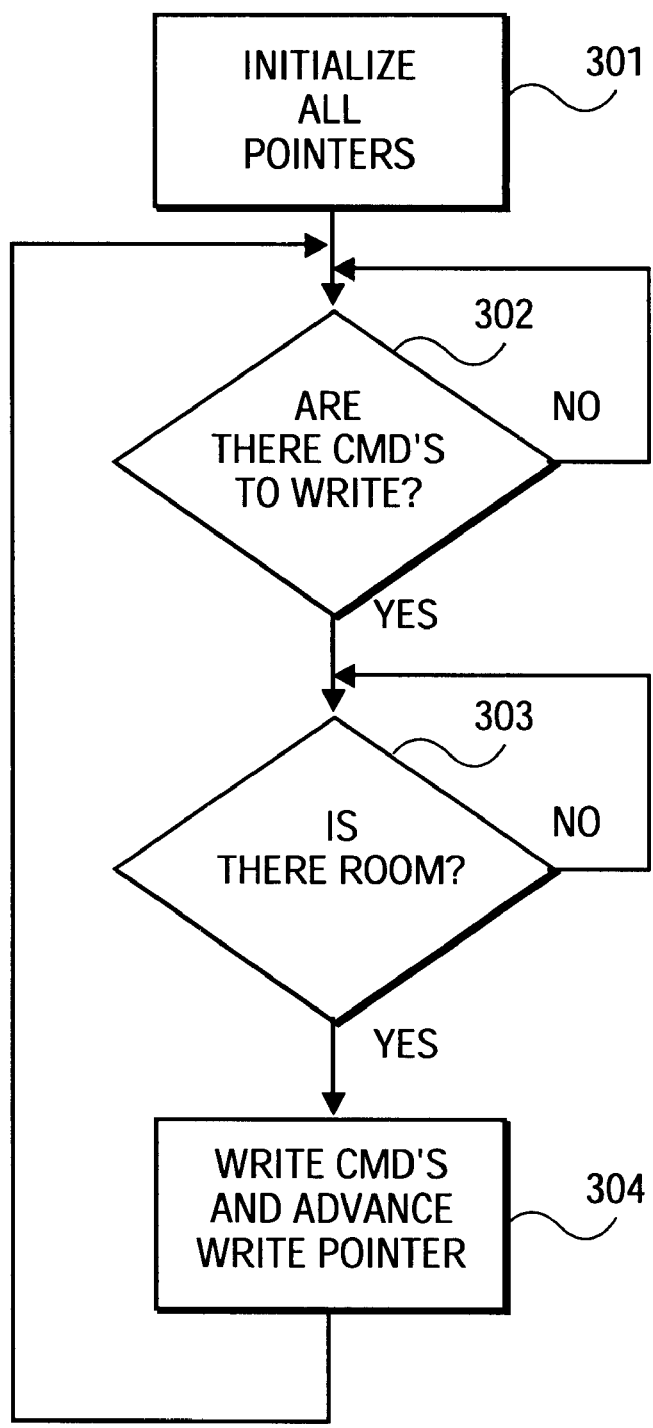
FIG. 3 is a flow chart illustrating one part of one embodiment of the method of the present invention.
Figure 4:
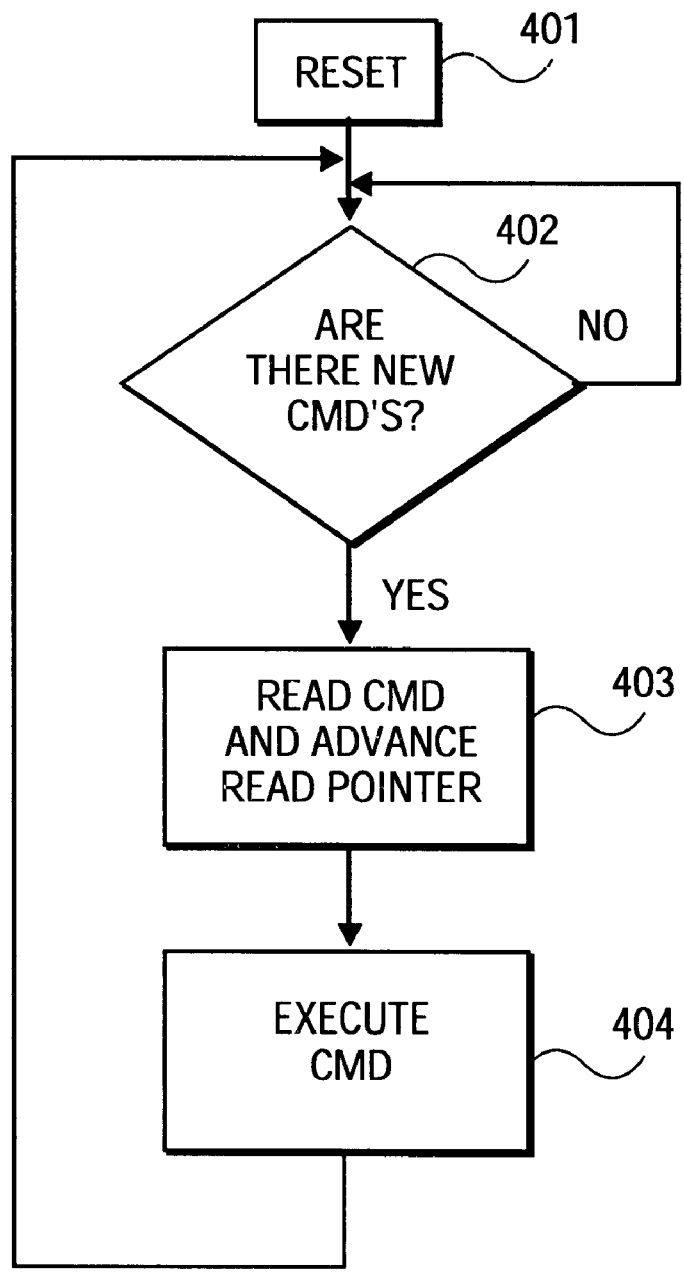
FIG. 4 is a flow chart illustrating another part of one embodiment of the method of the present invention.
Figure 5:
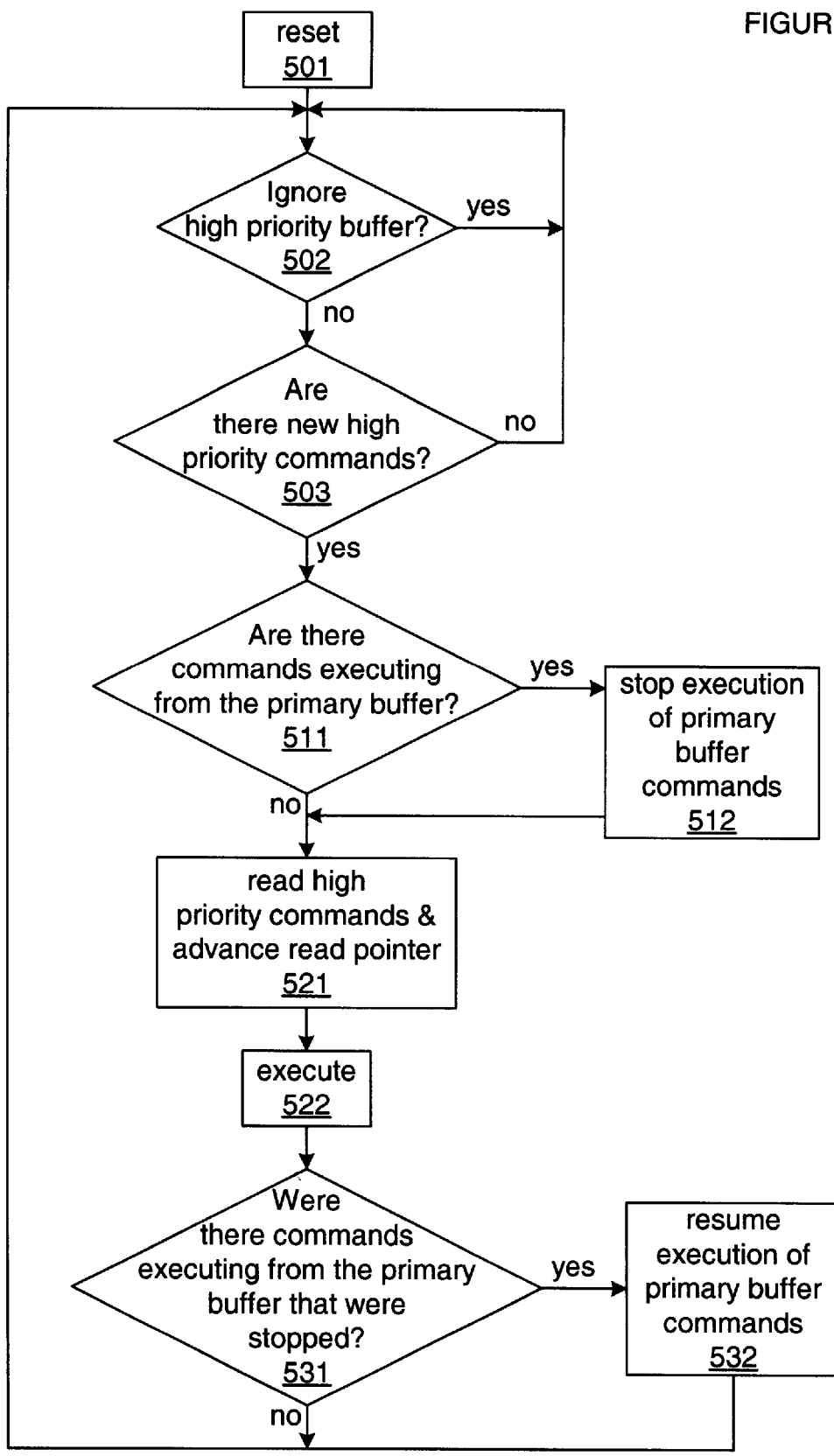
FIG. 5 is a flow chart illustrating still another part of one embodiment of the method of the present invention.
Figure 6:
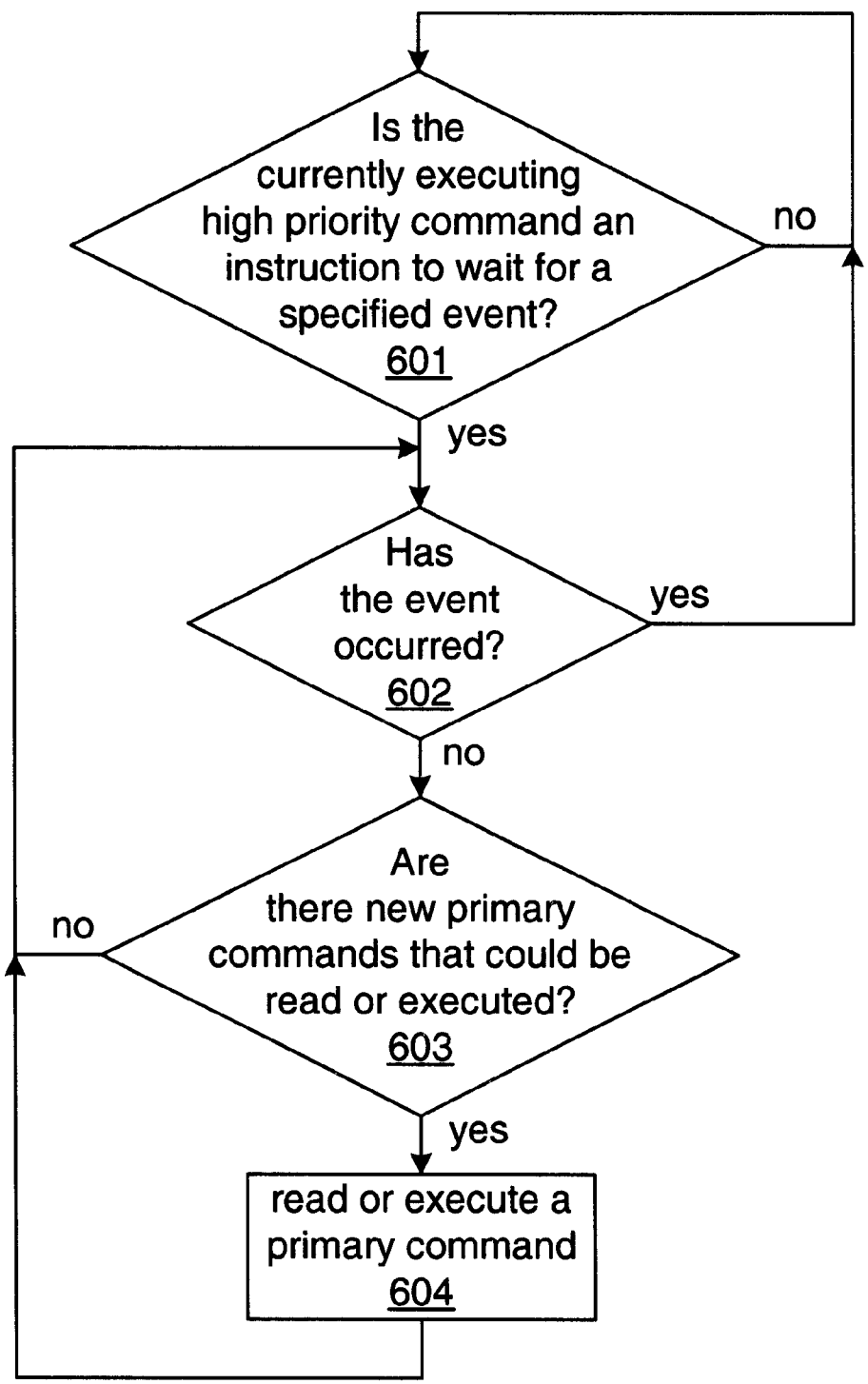
FIG. 6 is a flow chart illustrating still another part of one embodiment of the method of the present invention.

FIGS. 3, 4, 5 and 6 are flow diagrams that, taken together, depict one embodiment of the present invention. The flow diagram of FIG. 3 is followed by a CPU, or any one of multiple CPUs, in controlling a peripheral device by providing commands to a peripheral device through either of two buffers: a primary buffer and a high priority buffer. The flow diagrams of FIGS. 4, 5 and 6 are followed by a peripheral device in receiving and executing commands.

FIG. 3 is a flow diagram followed by a CPU, or any one of multiple CPUs, in one embodiment of the method of the present invention in providing commands to a peripheral device by way of either a primary or a high priority buffer. Read and write pointers are initialized at 301, and then a loop is entered at 302 until there are commands to written to a buffer. However, at 303, the writing of commands to a buffer is delayed if there is no room in the buffer. If there is room in a buffer, then commands are written into the buffer, and the write pointer associated with the buffer is advanced.

FIG. 4 is a flow diagram followed by a peripheral device in one embodiment of the method of the present invention in receiving and executing commands from a primary buffer. Corresponding to 301 of FIG. 3, read and write pointers associated with a primary buffer are initialized at 401, and then a loop is entered at 402 until there are new commands that have been written to that primary buffer. Whether or not new commands have been written to a primary buffer may be indicated by comparing the values of a read pointer and a write pointer associated with that primary buffer, or by waiting for some other signal provided by a CPU that has written new commands into that primary buffer. When new commands have been written to a primary buffer, then in 403, the peripheral device reads the new commands from that primary buffer and advances the read pointer associated with that primary buffer. At 404, the peripheral device executes the commands read from that primary buffer.

FIG. 5 is a flow diagram followed by a peripheral device in one embodiment of the method of the present invention in receiving and executing commands from a high priority buffer. Corresponding to 401 of FIG. 4, read and write pointers associated with a high priority buffer are initialized at 501. A loop is entered at 502, if a command was received in a primary buffer instructing the peripheral device to ignore commands in a high priority buffer, and this loop continues until the peripheral device receives another command in a primary buffer instructing it to once again accept and execute commands from a high priority buffer. Another loop may be entered at 503 until there are new commands that have been written to a high priority buffer. Whether or not new commands have been written to a high priority buffer is indicated in a manner similar to the manner described above for a primary buffer. When new commands have been written to a high priority buffer, and commands from a primary buffer are being executed at 511, the execution of those commands is stopped at 512. Then, at 521, commands are read from the high priority buffer for which an indication of new commands was received, and at 522, those commands are executed. If, at 531, commands from a primary buffer were being executed, but execution had been stopped at 512, then execution of those commands is resumed at 532.

FIG. 6 is a flow diagram followed by a peripheral device in one embodiment of the method of the present invention in executing commands from a high priority buffer. As any command from a high priority buffer is executed by a peripheral device, it is determined at 601 whether the command is an instruction for the peripheral device to wait for the occurrence of a specified event. If so, then at 602 a check is made of whether or not the specific event has occurred. If the event has occurred, then the reading and executing of commands from the high priority buffer continues. If the event has not occurred, then a check is made at 603 of whether there are any commands from a primary buffer that could be read or executed, in an effort to ensure that efficient operation of the peripheral device continues by allowing some execution of commands to take place. If there are no such commands from the primary buffer, then a check is again made at 602 as to whether the specified event has occurred. However, if there are such commands, then they are read or executed at 604 before a check is again made at 602 as to whether the specified event has occurred.

The invention has been described in conjunction with the preferred embodiment. It is evident that numerous alternatives, modifications, variations and uses will be apparent to those skilled in the art in light of the foregoing description.

What is claimed is:

1. A method for controlling a peripheral device comprising:
   writing at least one command to a first location in a system memory and advancing a first write pointer;
   reading the at least one command from the first location in a system memory and advancing a first read pointer;
   beginning executing the at least one command;
   writing at least one other command to a second location in a system memory and advancing a second write pointer;
   halting executing of the at least one command;
   reading the at least one other command from the second location in a system memory and advancing a second read pointer;
   executing the at least one other command; and
   resuming executing the at least one command.

2. The method of claim 1, wherein the reading the at least one other command, the advancing a second read pointer, the halting and resuming executing the at least one command, and the executing the at least one other command are prevented by the at least one command comprising a command for the peripheral device to ignore the presence of the at least one other command at the second location in a system memory.

3. The method of claim 1, further comprising halting the executing of the at least one other command when the at least one other command comprises a command to wait for the occurrence of a specified event, and resuming the executing of the at least one command.

4. The method of claim 1, wherein the peripheral device is selected from the group consisting of a graphics controller, an audio DSP, a disk controller and a network interface controller.

5. A peripheral device configured to be controllable by reading at least one command from a first location in a system memory in response to a first write pointer being advanced, advancing a first read pointer, beginning executing the at least one command, reading at least one other command from a second location in the system memory in response to a second write pointer being advanced, advancing a second read pointer, halting executing the at least one command, executing the at least one other command, and resuming executing the at least one command.

6. The peripheral device of claim 5, wherein the peripheral device is further configured to ignore the advancing of the second write pointer in response to the at least one command comprising a command for the peripheral device to ignore the presence of the at least one other command at the second location in a system memory.

7. The peripheral device of claim 5, wherein the peripheral device is further configured to resume executing the at least one command in response to the executing of the at least one other command being halted by the at least one other command comprising a command to wait for the occurrence of a specified event.

8. The method of claim 5, wherein the peripheral device is selected from the group consisting of a graphics controller, an audio DSP, a disk controller and a network interface controller.

9. A computer system, comprising:
   at least one system memory;
   at least one CPU coupled to the at least one system memory; and
   at least one peripheral device coupled to the at least one system memory and configured to be controlled by the at least one CPU by way of the at least one CPU writing at least one command to a first location in the at least one system memory and advancing a first write pointer, the at least one peripheral reading the at least one command from the first location and advancing a first read pointer, the at least one peripheral beginning executing the at least one command, the at least one CPU writing at least one other command to a second location in the at least one system memory and advancing a second write pointer, the at least one peripheral halting executing the at least one command, the at least one peripheral reading the at least one other command from the second location and advancing a second read pointer, and the at least one peripheral resuming executing the at least one command.

10. The computer system of claim 9, wherein the at least one peripheral device is further configured to ignore the advancing of the second write pointer by the at least one CPU in response to the at least one command comprising a command for the at least one peripheral device to ignore the presence of the at least one other command at the second location.

11. A computer readable medium comprising instructions, which when executed by a processor, causes the processor to control the peripheral device by writing at least one command to a first location in a system memory and advancing a first write pointer and writing at least one other command to a second location in a system memory and advancing a second write pointer; wherein the peripheral device reads the at least one command from the first location in a system memory, advances a first read pointer, begins executing the at least one command, halts executing of the at least one command, reads the at least one other command from the second location in a system memory, advances a second read pointer, executes the at least one other command, and resumes executing the at least one command.

12. The computer readable medium of claim 11, wherein the processor is further caused to control the peripheral device by writing the at least one command to the first location as a command for the peripheral device to ignore the presence of the at least one other command at the second location, and wherein the peripheral device ignores the advancing of the second write pointer by the processor.

* * * * *